Sept. 4, 1928.  1,683,077
C. S. JOYCE
VALVE FOR INTERNAL COMBUSTION ENGINES
Filed April 2, 1925  2 Sheets-Sheet 2

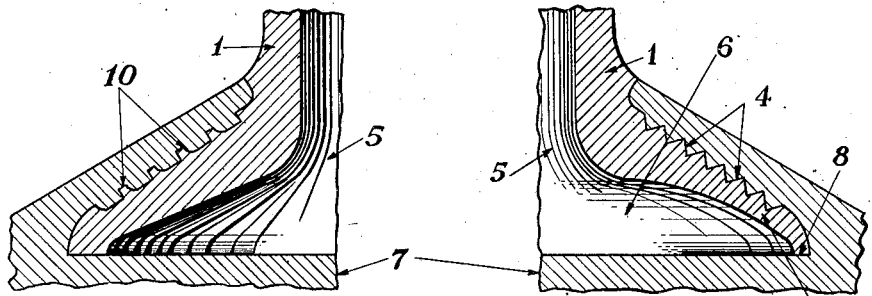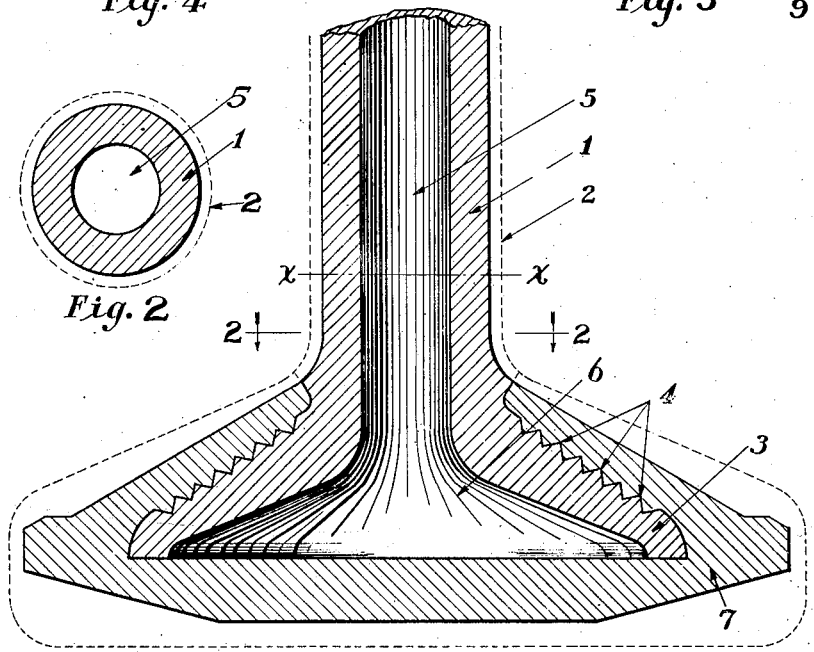

Inventor
By his Attorney

Patented Sept. 4, 1928.

1,683,077

UNITED STATES PATENT OFFICE.

CHARLES SHERIDAN JOYCE, OF BROOKLYN, NEW YORK.

VALVE FOR INTERNAL-COMBUSTION ENGINES.

Application filed April 2, 1925. Serial No. 20,229.

This invention relates to improvements in internal combustion engines and more particularly to water cooled exhaust valves especially designed for cooperation with engines of the Diesel type although it is, of course, to be understood that without material modification, the invention as hereinafter described is applicable to all types of internal combustion engines.

In order that a clearer perception of the present invention may be had and of the objects sought to be accomplished thereby, the valve will be hereinafter described with particular relation to its application to Diesel engines for governing the flow of gases from the working cylinder.

In ordinary practice exhaust valves are made with solid heads and are not cooled or they are made with hollow stems and heads and cooled by introducing water into the valve head through a pipe or tube running through the valve stem and which delivers the water or other cooling medium to the head of the valve from whence it finds its way out through the annular space between the tube and the inner surface of the hollow valve stem.

The desideratum of the present invention is to obtain a water cooled exhaust valve using a stem of ordinary steel, and having a heat resisting head or disc of special steel or other heat resisting alloy. Present types of valves made by ordinary methods are open to a number of objections, for example:

First, exhaust valves to meet the demand in high duty types of Diesel engines are subjected to heat and gas erosion which cannot be met by ordinary, easily machinable, steel which has been commonly used for valves in gas engines and other engines of low duty type.

It has been the practice with a great many engine builders to substitute cast iron for the head of exhaust valves using ordinary mild steel for the stem. This cast iron head withstands erosion and heat stresses in high duty Diesel engines better than does ordinary steel; but cannot be water cooled and has been generally unsatisfactory. To meet this demand, various heat resisting alloys have been developed, which, while having heat resisting and erosion resisting properties, lack physical properties necessary for the stems and which are extremely difficult to machine.

Second, in order that an exhaust valve may stand up under the severe heat conditions in a high duty Diesel engine it should be water cooled. Forgings made of heat resisting steel, making the stem an integral part of the valve, are comparatively expensive besides the machining difficulty involved set forth above. Such forgings further are open to a very serious objection, namely, that of requiring a plug in the disk face for accessibility in machining if the valve is to be water cooled. This plug, due to heat stresses involved, gives considerable trouble from leakage due to the fact that many of the heat resisting alloys cannot be welded satisfactorily.

Third, in previous attempts to make valves by casting heat resisting steel on a mild steel stem, trouble has been experienced in getting a perfect weld between the heat resisting steel and the mild steel stem so used.

It is, therefore, a further object of the present invention to provide a simple and practicable means of manufacturing valves to meet all the requirements for a water cooled exhaust valve and at the same time eliminate the objections above noted and common to the usual method of manufacture.

A further object is to provide a method which will make the valves easy and inexpensive to manufacture and capable of withstanding all heat stresses from expansion and contraction and gas erosion.

Other objects will be in part obvious and in part hereinafter pointed out in connection with the accompanying sheets of drawings illustrating several of the various possible embodiments of the present invention and in the several views of which corresponding parts are indicated by similar reference characters.

In these drawings,

Figure 1 is an elevational sectional view of the lower part of the valve.

Figure 2 is a section taken on the line 2—2, Figure 1.

Figures 3 and 4 are fragmentary longitudinal sectional views showing modifications.

Figure 5:
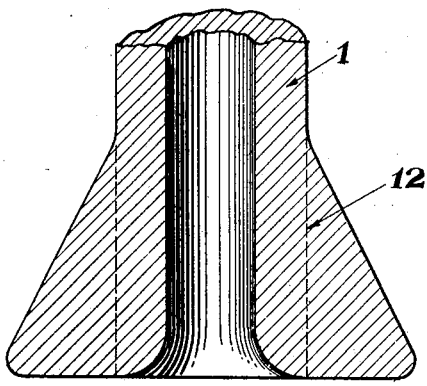
Figures 5, 6, 7 and 8 are longitudinal sectional views showing the various steps used in carrying out the process.

Referring to Figure 1, which is a cross sectional view of the valve as it appears completed, the part 1 is the stem to be made of a mild steel forging of a larger size than the indicated finished size, which larger size is shown by the dotted line at 2. This stem will be turned with a small disk on the bottom shown at 3 having on its upper surface serration shown at 4. This mild steel stem can be made from a solid forging, the hole through the center 5 being machined before the casting is done as is the internal conical space at 6. This space will be filled with a core which will prevent molten metal from running into and filling up said space in process of casting the head 7 on the valve. The core need not extend up further than indicated by line xx. The part above line xx can be preheated by the circulation of molten lead or other metal of low fusion point thus precluding to a great extent the passage of heat through the stem to prevent welding when the head is cast. However, it is obvious that the section shown in Figure 2 will have a greatly reduced conductive capacity for carrying away the heat contained in the molten steel while being cast. This in connection with the process mentioned above for preheating the stem will assure a weld throughout the entire length of juncture between metals. However, by proper methods, a perfect weld obtains throughout the entire length of the juncture without resorting to the pre-heating process.

Figure 3 shows another variation in the design which may be desirable in cases where it is difficult to obtain a weld due to reduction of metal used in casting the heat resisting head. The reduction of metal to the minimum is obviously desirable to reduce the ultimate cost of machining and in cases of very small valves there will probably be an insufficient amount of heat to weld the juncture full length without using an excessive amount of metal as set forth above. The design shown in Figure 3 is made to throttle the heat passing from point 8 by conductance up through the stem 1. This throttling action takes place at point 9 where the cross sectional area is greatly reduced. This will insure the lower point at least being perfectly welded.

Figure 4 shows a different style of serration 10 which can be used and is more desirable in some cases, in that the finlike construction of the serration will weld sooner than the style shown in Figure 1.

Figures 5, 6, 7 and 8 are cross-sectional views of a mild steel stem to be made by a special process not now being used which will give a much stronger stem and will reduce cost of manufacture considerably.

Figure 8:
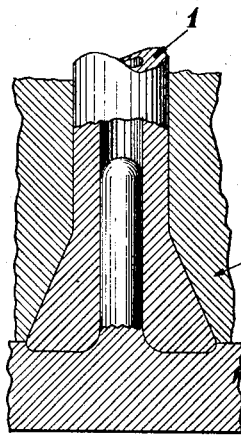
Figure 7:
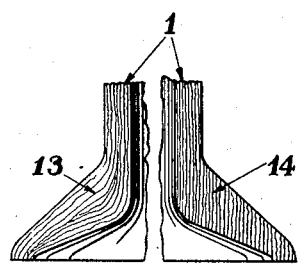
Figure 6:
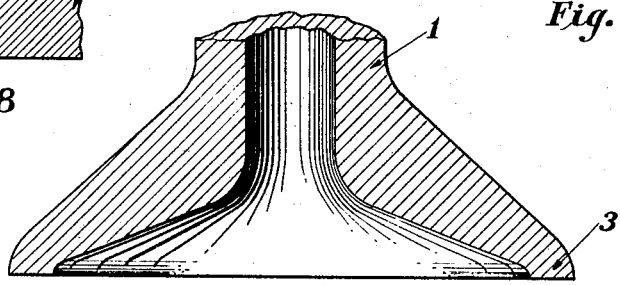

This method embodies the use of a drawn steel tubing to be upset by the use of a die 11 as shown in Figure 8. The first operation will make the end of the tube appear as shown in Figure 5, the metal shown outside of line indicated at 12 having been pushed up by the die. Various numbers of operations may be employed using a corresponding number of dies each increasing the amount of metal upset until the last operation gives a construction shown by Figure 6. This method obviously will eliminate the necessity for internal machining. It will further give a fibre structure as shown in Figure 7 where fibre turns to follow the general contour of the disc as shown at 13. This is a distinct advantage over a construction whereby the stem is machined from a solid forging as set forth above, and as is ordinarily done, in that the fibre structure in the latter construction does not follow the general contour of the disc but rather preserves its original direction, thereby causing the fibres to be cut as is shown at 14. In that one of the weak points experienced is at the point of juncture between the stem and head. It is claimed that this method of upsetting changes the fibre direction to suit the contour of the valve stem and appreciably increases the ultimate strength.

From the above it will be seen that the present invention contemplates an improved hollow valve particularly adapted for use in connection with Diesel engines where a water cooled valve is desirable. A valve constructed in the manner above described obviates certain objections heretofore experienced in providing a valve of this character and accordingly produces a more reliable and efficient construction. The invention also contemplates an improved process whereby valves of the above character may be speedily and inexpensively manufactured.

What I claim is:—

1. In a valve for internal combustion engines, the combination of a hollow stem, a hollow conical portion integral with the stem and substantially conforming to the shape of the completed valve, the thickness of the metal of the hollow conical portion decreasing toward the base of the cone, a valve head of heat resisting metal cast over the hollow conical portion, the conical portion of the valve head extending substantially to the juncture between the conical portion of the stem and the cylindrical portion thereof.

2. In a valve for internal combustion engines, the combination of a hollow stem, a hollow conical portion integral with the stem and substantially conforming to the shape of the completed valve, the thickness of the metal of the hollow conical portion decreasing toward the base of the cone, a valve head of heat resisting metal cast over the hollow conical portion, the conical portion of the valve head extending substantially to the juncture between the conical portion of the stem and the cylindrical portion thereof, the interior surface of the metal of the valve head forming the base of the cone formed by the hollow conical portion of the valve stem.

3. In a valve for internal combustion engines, the combination of a hollow stem, a hollow conical portion integral with the stem, the conical portion being connected to the stem at its apex, the thickness of the metal of the hollow conical portion decreasing toward the base of the cone, serrations upon the outer surface of the conical portion and a valve head of heat resisting metal cast over the hollow conical portion and intermeshing with the serrations upon the outer surface of the conical portion of the valve stem.

4. In a valve for internal combustion engines, the combination of a hollow stem, a hollow conical portion integral with the stem and substantially conforming to the shape of the completed valve, the thickness of the metal of the hollow conical portion decreasing toward the base of the cone, the fibres of the metal of the stem extending continuously into the conical portion, a valve head of heat resisting metal cast over the hollow conical portion, the conical portion of the valve head extending substantially to the juncture between the conical portion of the stem and the cylindrical portion thereof.

5. In a valve for internal combustion engines, the combination of a hollow stem, a hollow conical portion integral with the stem, the conical portion being connected to the stem at its apex, the thickness of the metal of the hollow conical portion decreasing toward the base of the cone, serrations upon the outer surface of the conical portion, the fibres of the metal of the stem extending continuously into the conical portion, and a valve head of heat resisting metal cast over the hollow conical portion and intermeshing with the serrations upon the conical portion.

6. In a valve for internal combustion engines, the combination of a hollow stem, a hollow conical portion integral with the stem, the conical portion being connected to the stem at its apex, the thickness of the metal of the hollow conical portion decreasing toward the base of the cone, serrations upon the outer surface of the conical portion, the fibres of the main mass of metal of the conical portion being continuous with the fibres of the stem of the valve, and a valve head of heat resisting metal cast over the hollow conical portion and intermeshing with the serrations upon the conical portion.

Signed at Brooklyn, New York, this 10th day of February, 1925.

CHARLES SHERIDAN JOYCE.